United States Patent [19]

Brugger

[11] 4,256,546
[45] Mar. 17, 1981

[54] METHOD OF MAKING A BAKING FORM FOR IMPROVED BROWNING OF BAKED GOODS

[75] Inventor: Robert Brugger, Filderstadt, Fed. Rep. of Germany

[73] Assignee: Langbein-Pfanhauser Werke AG, Neuss, Fed. Rep. of Germany

[21] Appl. No.: 60,347

[22] Filed: Jul. 25, 1979

Related U.S. Application Data

[62] Division of Ser. No. 925,746, Jul. 18, 1978, Pat. No. 4,177,438.

[30] Foreign Application Priority Data

Jul. 20, 1977 [DE] Fed. Rep. of Germany ....... 2732668

[51] Int. Cl.³ .................... C25D 11/08; C25D 11/16; C25D 11/20
[52] U.S. Cl. ................................. 204/33; 204/35 N; 204/58
[58] Field of Search ......................... 204/58, 33, 35 N

[56] References Cited

U.S. PATENT DOCUMENTS

| 3,761,362 | 9/1973 | Oida et al. ............................. 204/58 |
| 3,834,998 | 9/1974 | Watanabe et al. ..................... 204/58 |
| 3,849,263 | 11/1974 | Gedde .................................... 204/58 |

OTHER PUBLICATIONS

"The Surface Treatment & Finishing of Al and Its Alloys" by S. Wernick et al., 1964, 3rd Ed., p.181.

Primary Examiner—R. L. Andrews
Attorney, Agent, or Firm—Karl F. Ross

[57] ABSTRACT

An aluminum baking form is provided with internal and external coatings of aluminum oxide which are of black coloration and which contain metals other than aluminum and serve as infrared transmitters or collectors. The metal incorporated in the aluminum oxide layer is preferably tin or silver or both.

1 Claim, 2 Drawing Figures

METHOD OF MAKING A BAKING FORM FOR IMPROVED BROWNING OF BAKED GOODS

This is a division of application Ser. No. 925,746, filed July 18, 1978, now U.S. Pat. No. 4,177,438.

FIELD OF THE INVENTION

The present invention relates to improved aluminum utensils for baking purposes and, more particularly, to aluminum baking forms. The invention especially relates to improved aluminum baking forms having internal and external aluminum oxide coatings of black coloration, to a method of making such aluminum utensils, and to the use of special aluminum oxide coatings for aluminum utensils, especially baking forms.

BACKGROUND OF THE INVENTION

It is known to provide cooking utensils, especially baking dishes, trays, forms and the like with various coatings for different purposes, e.g. as non-stick coatings, as heat absorbers or transmitters, and as thermal conductors.

For the purposes of this discussion of the background of the invention and for the subsequent discussion of the invention itself, the term "baking form" will be used to describe any utensils having a recess in which a comestible may be baked. Typical of such "baking forms" are pie pans, cake pans, ring pans and the like.

The term "aluminum" as used herein to refer to baking forms and like utensils and as it will be used hereinafter in connection with the discussion of the invention, is intended to include all conventional aluminum alloys which have been hitherto used for the production of baking utensils and existing alloys suitable for use in baking utensils whether or not they have been so used heretofore.

Baking utensils, especially baking forms of the type described, are generally fabricated from sheet aluminum by deep drawing. The sheet material has also been constituted of aluminum sheet or strip heretofore. The only requisite has been that the metal from which the baking form was drawn have deep-drawing qualities.

As long as the baking form is constituted of steel sheet, it is necessary to provide corrosion protection against rusting of the inner and outer surfaces.

To this end, anticorrosion coatings are applied internally and externally and it has been found that tin coating (to produce tin plate) or, more recently, coatings or polytetrafluoroethylene are satisfactory for this purpose.

Coatings of polytetrafluoroethylene, however, suffer from poor adhesion to the substrate and reduce the heat transfer rather than improve the same. As a result, it is difficult to brown the comestibles which are subject to baking. Browning thus either never occurs or is effected only at high baking temperatures which may be detrimental to the coating.

The heat transfer is primarily by heat conduction and experience has shown that infrared radiation is scarcely capable of being passed through the walls of the baking form.

The "browning" of the baked material is, however, effected principally by the infrared radiation.

The foregoing applies to baking forms which consist of aluminum sheet provided internally and externally with colorless aluminum-oxide coatings and/or with polytetrafluoroethylene.

It has been found to be possible, in prior work in this field, to improve the heat transfer of the baking forms to the comestible material to be baked by forming the baking utensil from copper sheet. In fact, baking utensils have also been formed from steel sheet provided with a brownish coating. Neither technique has been fully successful because of the problem of corrosion. The latter techniques have never influenced the aluminum-sheet technology in dealing with aluminum baking utensils and, as far as I am aware, there has been no fully successful attempt to improve the heat transfer of aluminum-sheet baking utensils to the comestible product.

OBJECTS OF THE INVENTION

It is the principal object of the present invention to eliminate the aforedescribed disadvantages and provide an improved baking form from aluminum sheet material which is characterized by high heat transfer and the capability to enable, without the use of destructive temperatures, satisfactory browning of the comestible product.

Another object of the invention is to provide an improved aluminum baking form with high heat transfer and low corrodibility and of low cost.

Still another object of the invention is to provide an improved method of making a baking form from aluminum sheet material whereby the disadvantages of earlier forms are avoided and high heat transfer is obtained with low corrodibility.

Still another object of the invention is to provide a new use for a certain type of aluminum sheet material.

SUMMARY OF THE INVENTION

These objects and others which will become apparent hereinafter are attained, in accordance with the present invention, in a baking form which is composed of aluminum sheet material and is coated internally and externally with an aluminum oxide layer colored black by the incorporation therein of at least one metal other than the aluminum. The layer serves as an infrared transmitter and absorber and thus the outer coating of the utensil picks up incident infrared radiation and the inner layer acts as a transmitter for this radiation to the comestible material. The metal which is incorporated in the aluminum oxide layer to blacken the latter is preferably tin or silver.

The black aluminum oxide coating provided internally and/or externally can be provided by the following steps:

(a) etching or pickling in sodium hydroxide solution (aqueous), (b) pickling in nitric acid, (c) anodization by the direct-current sulfuric acid method, and (d) electrolytic coloring with the incorporation of tin compounds and/or silver compounds, preferably tin sulfate, in the electrolyte contacting the surfaces to be colored and coated.

At least the electrolytic coloring and anodic processes are carried out on the substrate and preferably all of the processes (a) through (d) thereof are carried out in the order described.

The electrolytic coloring can, however, also be carried out to incorporate other metals besides tin or silver in the aluminum oxide coating. In any case, an aluminum oxide coating is first or simultaneously formed upon the sheet and the metal (coloring metal) is incorporated in the lattice structure of the aluminum oxide coating.

The etching or pickling is preferably carried out in a sodium hydroxide solution which may have a sodium hydroxide concentration between 2% and 20%, preferably between 5% and 12% and most advantageously about 9%. The temperature for this etching or pickling step is preferably between 20° C. and the boiling point of the solution and most advantageously between 50° C. and 70° C. with best results being obtained at 65° C.

The acid pickling step is effected at a temperature between 10° C. and 30° C., preferably ambient or room temperature of about 20° C., in semiconcentrated sulfuric acid.

The anodization step is preferably carried out between 5° C. and 40° C., most advantageously between 10° C. and 30° C. and with best results at about 20° C. with a current density of about 1.5 amperes per decimeter$^2$. The current density may, however, range between 1 and 2 amperes per decimeter$^2$ and even lie between 0.25 and 10 amperes per decimeter$^2$.

The electrolytic coloring step is, however, of greatest importance to the present invention and is preferably carried out by alternating current at line frequency (50 or 60 Hz) transformed from line voltage to a voltage of 15 to 20 volts and at a temperature of about 22° C. The temperature can be varied between 15° C. and 30° C. The coloring bath composition for 100 liters (best mode) is preferably 6.50 kg tin sulfate,
6.00 kg of polyglycol,
10.00 kg of 65% phenylsulfonic acid,
10.00 kg of concentrated sulfuric acid,
2.00 kg of tartaric acid, and
0.50 kg of aluminum sulfate.

When silver is to be incorporated into the system, it may be used in the same quantity as the tin sulfate, advantageously in the form of the silver nitrate, or the tin sulfate component may be replaced by a mixture of tin sulfate and silver nitrate.

Each of the values given in the foregoing Table may be varied between ±25%.

Following the electrolytic coloring step, the coatings are subjected to consolidation in de-ionized water at a temperature of 98° C. to 100° C. or in superheated steam. The treatment time for the individual steps may be selected at will as long as the desired degree of black coloration is obtained. As a practical matter, each step can be carried out for a period between 5 minutes and 3 hours without difficulty although for best results, the various treatments should take no longer than 15 minutes to 1 hour.

Naturally, the baking form, after shaping from aluminum sheet, should be subjected prior to the electrolytic treatment to cleaning and degreasing. This can be effected in the usual way, e.g. by alkaline pickling.

The invention is based upon the surprising discovery that a baking form which is internally and externally provided with a black coating and anodically in the aforedescribed manner functions in a unique way during the heat transfer from the exterior to the comestible material within the baking form.

The external coating appears to act as an infrared absorber so that impinging infrared radiation, e.g. from the heat of the baking oven, is not reflected but rather is practically fully absorbed. The resulting heat generated in the aluminum wall of the baking utensil is transformed into infrared radiation which is re-emitted and thus impinges upon the comestibles to be baked.

The coating thus constitutes an infrared absorber on the one hand and an infrared transmitter on the other.

Even more surprisingly the coating is not only significant because of its effect in the heat transfer, but also because it provides practically complete protection against corrosion. The coating is able to withstand substantially all mechanical stresses the baking utensil may be subjected to.

The coatings have no effect upon the comestible product and are not capable of introducing health-affecting substances into the comestibles baked in the utensil. The baked material does not adhere strongly or detrimentally to the coating and the coatings can be applied without particular difficulty to all aluminum alloys now in use for the fabrication of baking forms.

An even greater advantage of the system of the present invention may reside in the fact that the baking time is significantly reduced, thereby resulting in energy saving.

Stated otherwise, for a given baking time, the baking temperature can be reduced for a given result and, conversely, the usual baking temperature may be applied and the baking time thereby reduced. The system of the present invention has been found to allow intensive browning of the baked material without significant danger of burning.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
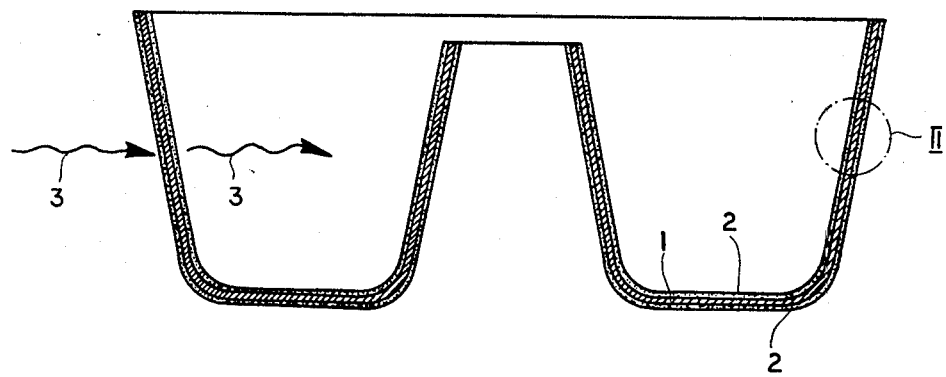
FIG. 1 is a cross-sectional view through a ring-type baking form according to the present invention.
Figure 2:
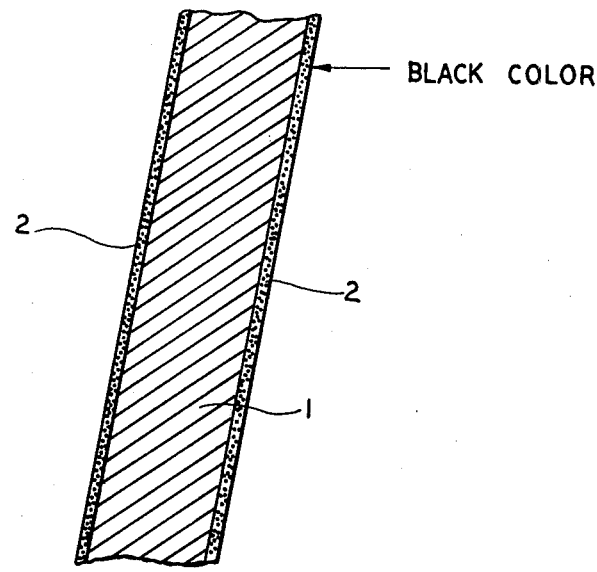
FIG. 2 is a detail view of the region II of FIG. 1, drawn to a greatly enlarged scale.

A conventional one-piece ring-type baking form has been shown in FIGS. 1 and 2 and is composed of aluminum sheet 1 by the deep drawing process.

The aluminum sheet 1 is formed internally and externally with respective coatings 2 which are applied anodically and consist of aluminum oxide. These aluminum oxide coatings are colored black and the coloring step is carried out as described above. These coatings thus function as infrared absorbers and transmitters in the manner previously described.

In FIG. 1, the undulating arrows 3 represent the impinging infrared radiation and the infrared radiation which is radiated from the inner coating inwardly to the material to be baked.

SPECIFIC EXAMPLE

A baking form which satisfies all of the requirements set forth above and has all the advantages described, is produced in the usual manner by deep drawing and aluminum sheet. The coating is applied as follows:

(a) The form is immersed in 9% sodium hydroxide solution (aqueous) at 65° C. for a period of 1 minute for etching and pickling.

(b) The thus-etched and pickled baking form is immersed in semiconcentrated nitric acid at a temperature of 20° C. for 10 seconds, thereby achieving a certain degree of neutralization and further pickling.

(c) The form is subjected to internal and external anodization against internal and external electrodes over a period of 40 minutes by the direct current sulfuric acid anodization process using a current density of 1.5 amperes per decimeter$^2$ and a temperature of 20° C.

(d) The utensil, coated with aluminum oxide layers on both surfaces, is then colored for a period of 8 to 10 minutes with transformer-produced alternating current (50 Hz) at 15 to 20 volts and a temperature of 22° C. The best results were obtained with 18 to 20 volts.

The bath composition for the electrolytic coloring step is as follows for 100 liters:

6.5 kg tin sulfate,
6.0 kg polyglycol,
10.0 kg of 65% phenylsulfonic acid,
10.0 kg concentrated sulfuric acid,
2.0 kg tartaric acid, and
0.5 kg aluminum sulfate.

(e) The block-colored coatings are consolidated by treating the utensil with de-ionized water at a temperature of 98° C. to 100° C. for a period of 60 minutes. A similar result was obtained by subjecting the coatings to superheated steam for a similar period.

Similar results were also obtained when 6.5 kg of silver nitrate was substituted for the 6.5 kg of tin sulfate and when, instead of the 6.5 kg of tin sulfate, 3.25 kg each of tin sulfate and silver nitrate were used in the coloring bath.

I claim:

1. A method of making a baking form for browning baked goods and of improving the browning capabilities of a baking form drawn from sheet aluminum comprising anodically forming aluminum oxide coatings along internal and external surfaces of the drawn aluminum sheet; and electrolytically coloring said coatings in the presence of a tin or a silver compound to incorporate tin or silver into said coatings, the drawn aluminum sheet being subjected in succession to the steps of
   (a) etching and pickling in aqueous substantially 9% sodium hydroxide solution at a temperature of about 65° C.,
   (b) pickling in semiconcentrated nitric acid at a temperature of about 20° C.,
   (c) anodization by direct-current sulfuric treatment with a current density of about 1.5 amperes per decimeter$^2$ at a temperature of about 20° C., and
   (d) electrolytic coloring in the presence of the tin or silver compound by the application of transformed alternating current at a voltage of about 15 to 20 volts and at a temperature of 22° C. in a bath having the following composition for 100 liters:
   about 6.5 kg tin sulfate, silver nitrate or a combination thereof,
   about 6.0 kg polyglycol,
   about 10.0 kg of 65% phenylsulfonic acid,
   about 10 kg concentrated sulfuric acid,
   about 2.0 kg tartaric acid, and
   about 0.5 kg aluminum sulfate.

* * * * *